United States Patent [19]

Shum

[11] Patent Number: 5,818,662

[45] Date of Patent: Oct. 6, 1998

[54] STATIC ATTITUDE AND STIFFNESS CONTROL FOR AN INTEGRATED SUSPENSION

[75] Inventor: Victor Wing Chun Shum, San Jose, Calif.

[73] Assignee: International Business Machines Corporation, Armonk, N.Y.

[21] Appl. No.: 680,398

[22] Filed: Jul. 15, 1996

[51] Int. Cl.[6] .............................. G11B 5/48; G11B 21/16
[52] U.S. Cl. ........................................................... 360/104
[58] Field of Search ..................................... 360/104, 103

[56] References Cited

U.S. PATENT DOCUMENTS

| 4,670,804 | 6/1987 | Kant et al. | 360/102 |
|---|---|---|---|
| 4,991,045 | 2/1991 | Oberg | 360/104 |
| 4,996,623 | 2/1991 | Erpelding et al. | 360/104 |
| 5,331,489 | 7/1994 | Johnson et al. | 360/104 |
| 5,467,237 | 11/1995 | Takahashi | 360/114 |
| 5,491,597 | 2/1996 | Bennin et al. | 360/104 |
| 5,557,489 | 9/1996 | Nakashima et al. | 360/104 |
| 5,570,261 | 10/1996 | Frater et al. | 360/104 |
| 5,606,477 | 2/1997 | Erpelding et al. | 360/104 |
| 5,608,591 | 3/1997 | Klaasen | 360/104 |

FOREIGN PATENT DOCUMENTS

| 60-136911 | 9/1985 | Japan . |
|---|---|---|
| 4-143978 | 5/1992 | Japan . |
| 4-146516 | 5/1992 | Japan . |

OTHER PUBLICATIONS

IBM TDB vol. 38, No. 05, May 1995 "INTEGRATED LOW PROFILE SUSPENSION AND ARM FOR DISK FILES" pp. 437–438.

*Primary Examiner*—Robert S. Tupper
*Assistant Examiner*—William J. Klimowicz
*Attorney, Agent, or Firm*—Noreen A. Krall

[57] ABSTRACT

An integrated suspension in a magnetic storage system having improved static attitude and stiffness control includes a rigid load member, a flexible member and a plurality of conductive leads integrally formed with the flexible member. The flexible member includes one or more pairs of tabs which protrude from the lateral edges of the flexible member. The pairs of tabs press against the conductive leads, and occupy a plane which is angled in relation to the horizontal axis of the flexible member. The conductive leads are oriented in the direction of the protruding tabs. The conductive leads are longer than the side edges of the flexible member, thereby forming a curve between the first pair of tabs and a second pair of tabs.

10 Claims, 4 Drawing Sheets

STATIC ATTITUDE AND STIFFNESS CONTROL FOR AN INTEGRATED SUSPENSION

FIELD OF INVENTION

This invention relates to a slider suspension for a data recording disk drive. More particularly, this invention relates to a laminated suspension having improved static attitude and stiffness control, and a method of manufacturing the same.

BACKGROUND OF THE INVENTION

Disk drives are information storage devices that utilize at least one rotatable disk with concentric data tracks containing the information, a transducer (or head) for reading data from or writing data to the various tracks, and a transducer positioning actuator connected to the transducer for moving it to the desired track and maintaining it over the track during read and write operations. The transducer is attached to a slider, such as an air-bearing slider, which is supported adjacent to the data surface of the disk by a cushion of air generated by the rotating disk. The transducer can also be attached to a contact-recording type slider. In either case, the slider is connected to a support arm of the transducer-positioning actuator by means of a suspension.

The suspension provides dimensional stability between the slider and the actuator arm, controlled flexibility in pitch and roll motion of the slider relative to its direction of motion on the rotating disk, and resistance to yaw motion. In conventional disk drives having air-bearing sliders, the suspension provides a load or force against the slider which is compensated by the force of the air-bearing between the slider air-bearing and the disk surface. Thus, an air-bearing slider is maintained in extremely close proximity to, but out of contact with, the data surface of the disk. The suspension typically comprises a load beam which is mounted at one end to the actuator arm, and a flexure element which is attached to the other end of the load beam and whose gimbal area supports the slider. The load beam provides the resilient spring action which biases the slider towards the surface of the disk. This spring action provides flexibility for the slider as the slider rides on the cushion of air between the air-bearing surface and the rotating disk. Also, the gimbal provides roll and pitch flexibility needed for the slider to follow the disk surface. Such a suspension is described in assignee's U.S. Pat. No. 3,823,416.

In a conventional air-bearing slider suspension assembly, the slider is mechanically attached to the flexure element of the suspension by epoxy bonding. The electrical connection between the transducer and the read/write electronics is made of twisted wires which run the length of the suspension load beam and extend over the flexure element of the slider. The ends of the wires are soldered or ultrasonically bonded to the transducer bonding areas or pads located on the slider. Another type of suspension is a composite or laminated structure comprising a base layer with patterned electrical leads formed thereon and an insulating cover layer, as described in IBM Technical Disclosure Bulletin, Vol. 22, No. 4 (September 1979), pp.1602–1603 and Japanese Kokai No. 53-74414 (Jul. 1, 1978) and 53-30310 (Mar. 22, 1978). In the laminated suspension described in Japanese Kokai No. 53-74414, the slider is epoxy-bonded to the laminated suspension and the transducer bonding areas are soldered to the electrical leads formed on the suspension.

Assignee's U.S. Pat. No. 4,761,699 describes yet another type of laminated suspension for use with a conventional slider wherein solder ball connections provide both the mechanical connection of the slider to the laminated suspension and the electrical connection of the transducer to the leads on the laminated suspension.

Assignee's U.S. Pat. No. 4,996,623 describes yet another type of laminated suspension for use with a negative pressure slider. For this type of suspension, it is desirable to maintain the slider adjacent to the data surface of the disk with as low a loading force as possible. The suspension is a flat, flexible sheet of material bonded on both sides to patterned metal layers and having hinge regions. Portions of the laminated suspension near the hinge regions are bent such that the suspension supports the slider in a manner to prevent the transducer from contacting the disk surface, and thus the stiction problem associated with the negative pressure slider and the disk surface is eliminated.

With the push for smaller disk drive systems it becomes a challenge to develop smaller integrated suspension structures that meet the requirements of disk drive systems of smaller physical size. Due to the relatively small physical size and fragile structure of the suspension assembly, placement of each element and feature is critical. With tooling and wiring windows, mount plates and attachment areas occupying much of the body of the suspension, it is desirable to route the conductive leads or wires along the sides or edges of the suspension to optimize use of the surfaces of the suspension. Alternatively, performance of the suspension may dictate the leads be routed along the sides of the suspension.

One of the problems with disk drives using the conventional suspension or the laminated type suspension is that positioning of the electrical lead lines about the perimeter of the suspension often has a substantial and sometimes unpredictable effect on the performance of the suspension. For example, in a laminated suspension, the conductors often extend from the transducer bonding area, alongside one or both of the sides of the suspension for attachment to the electronics module in the actuator arm. As will be explained below, the conductors are somewhat free in their movement along the sides of the suspension. In the laminated suspension comprising a support layer, an insulating layer and a conductive layer, the conductive leads, often called traces, are often copper conductors laminated on polyimide. The traces are usually free of a support layer for mainly two reasons. First, there is a desire to separate the function of electrical signal conduction from the function of the mechanical structure of the suspension. The mechanical structure of a suspension is to carry load and therefore stress. It is not desirable to have the traces subjected to too much load and stress because this will affect the operational characteristics of the suspension. Second, the static stiffness, also known as pitch and roll stiffness, and static attitudes, known also as pitch and roll angles, are important functional parameters of a suspension. The properties of the support layer of a laminated suspension are usually well defined and stable through manufacturing, shipping and operating conditions for a file. By removing the support layer from the conductive traces, they are substantially weakened structurally, and therefore the effect they have on the functional parameters of the suspension is reduced.

Although the effect the conductor traces have on the suspension is reduced by the above described design, the remaining effect is still substantial and unpredictable. For example, the trace length has had an effect on the stiffness of a suspension assembly. Dependant on the actual length of the conductive traces alongside the flexure, the measured pitch stiffness can vary by more than a factor of two.

Variations on the length of the conductive traces can be caused by manufacturing tolerance, temperature and/or humidity differences or even force exerted by contact measurement probes. Another problem encountered by the variation in the length of the traces alongside the flexure is that it will affect the static attitude of the suspension. An unpredicted elongation or reduction of the conductive flexure traces may change or distort the static attitude. Still another problem encountered, is that the conductive traces are not in the same plane as the flexure in the assembled state. The conductive traces will take on an initial orientation above or below the flexure. If the suspension is disturbed, the orientation of the traces may change. The disturbance may come in the form of the suspension doing gimballing or airflow in the HDA. Again, as a result, the stiffness will be non-linear and the static attitude will be affected.

It therefore can be seen that there is a need for a suspension assembly wherein the conductive leads can be positioned at desired locations, while their impact on the suspension performance characteristics is minimized. It can also be seen that there is need to provide a laminated suspension wherein the orientation of the conductive traces is controlled. It can also be seen that there is a further need for a laminated suspension wherein changes in the length of the conductive leads is controlled.

SUMMARY OF THE INVENTION

To overcome the limitations in the prior art described above, and to overcome other limitations that will become apparent upon reading and understanding the present specification, the present invention is an integrated suspension for use in a data recording disk drive having pairs of bend tabs to support and control the orientation of the conductive leads. The integrated suspension is a multi-layer structure having a base or substrate layer. The suspension has a gimbal area to which a slider is attached. At least one transducer is attached to the slider for reading data from and writing data to a disk surface. At least one conductive lead structure extends out beyond the slider end of the suspension toward the termination end. The electrically conductive layer is etched to form one or more electrically conductive leads or traces interconnecting the transducer and the read/write electronics module in the drive. Each trace has a bonding area at each of its ends for electrical connection to the transducer and the electronics module, respectively. The electrical traces are preferably copper or gold plated copper and may be protected with an optional electrically insulating cover layer, for instance, polyimide. The base layer of the integrated suspension is preferably made of alumina or stainless steel. In another embodiment of the invention, the base layer is a second electrically conductive layer and an electrically insulating layer lies between the first and second electrically conductive layers. The second conductive layer may be made of stainless steel while the second insulating layer may be polyimide.

In a preferred embodiment of the present invention, one or more bend tabs are patterned as part of the base layer and extend outward, substantially perpendicular to the suspension, underlying the electrical traces. The bend tabs are separated from the electrical traces by the insulating layer. The bend tabs occupy a plane that is angled with respect to the horizontal plane of the suspension, thereby orienting the electrical traces to bow slightly above or slightly below the suspension, depending on the desired results. In the preferred embodiment, where the electrical traces extend along both side edges of the suspension, two pairs of bend tabs are disposed on the suspension. A first pair of bend tabs is formed as part of the support layer adjacent to the slider end of the suspension. A second pair of bend tabs is formed as part of the support layer near the termination end of the suspension. The pairs of bend tabs are positioned such that they are opposite each other on the lateral edges of the suspension, to balance the weight of the tabs across the suspension centerline. As previously mentioned, the pairs of bend tabs are angled with respect to the horizontal plane of the suspension. Considering the suspension as the horizontal axis, one of the pair of bend tabs will be positioned at an acute angle with respect to the horizontal axis, while one pair will be positioned at an obtuse with respect to the horizontal axis, thereby forcing the electrical traces to buckle or bow slightly above the plane of the suspension. Similarly, the positive angles just described may be oriented as negative angles with respect to horizontal, thereby orienting the traces to bow below the plane of the suspension.

Another object of the present invention is to minimize the static attitude and stiffness contribution of the conductive traces. To this end, the traces are intentionally elongated to form an exaggerated curve between the bend tab constraints. This larger curve resulting from the extra length built into the traces will relieve the tensional pull by the traces on the flexure when the slider is flying and gimbaling. This has been shown to be able to reduce static stiffness, especially pitch stiffness by as much as 50 percent. This intentional elongation in the conductive traces has also been found to compensate or absorb any change in the length of the traces either from temperature and humidity change or from manufacturing tolerance build up.

In an alternative embodiment, there may be electrically conductive traces along the edge of only one of the sides of the suspension. In this instance, the weight of the suspension and the bend tabs will be balanced so as to minimize any effect on the pitch and roll of the suspension.

In yet another alternative embodiment, there may be only one pair of bend tabs, one on each side of the suspension, to orient the electrically conductive traces either above or below the horizontal plane of the suspension.

BRIEF DESCRIPTION OF THE DRAWINGS

Referring now to the drawings in which like reference numbers represent corresponding parts throughout.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
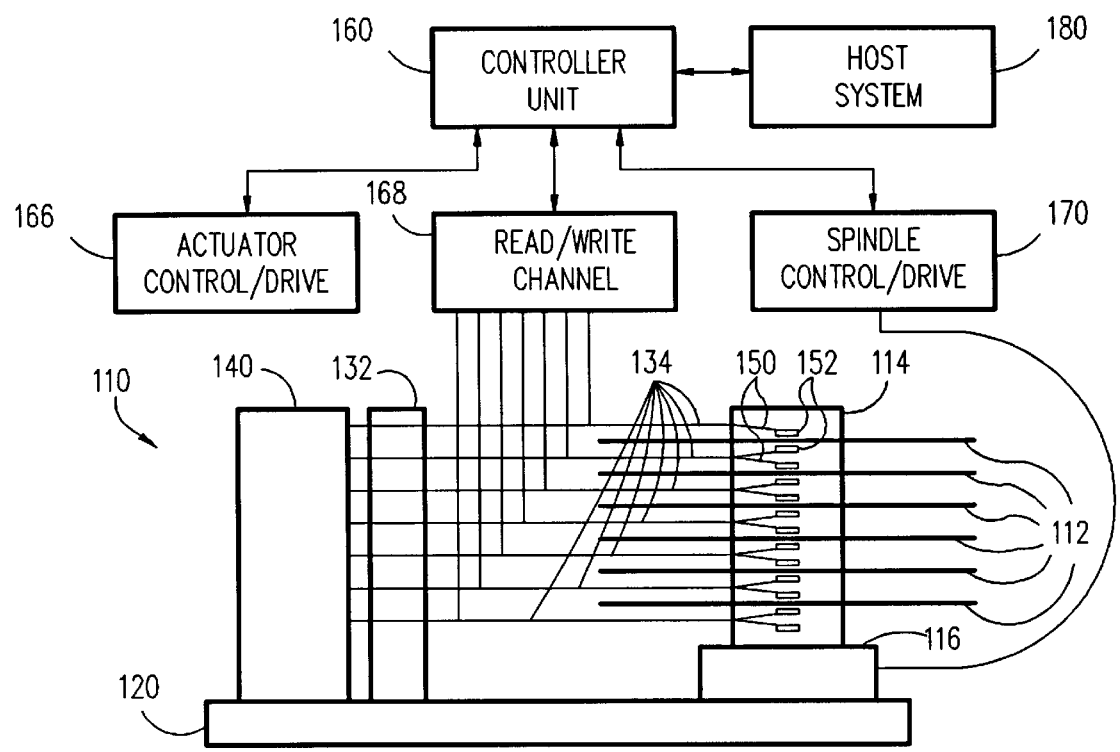
FIG. 1 is a side view of a disk drive system and a controller unit in block form.
Figure 2:
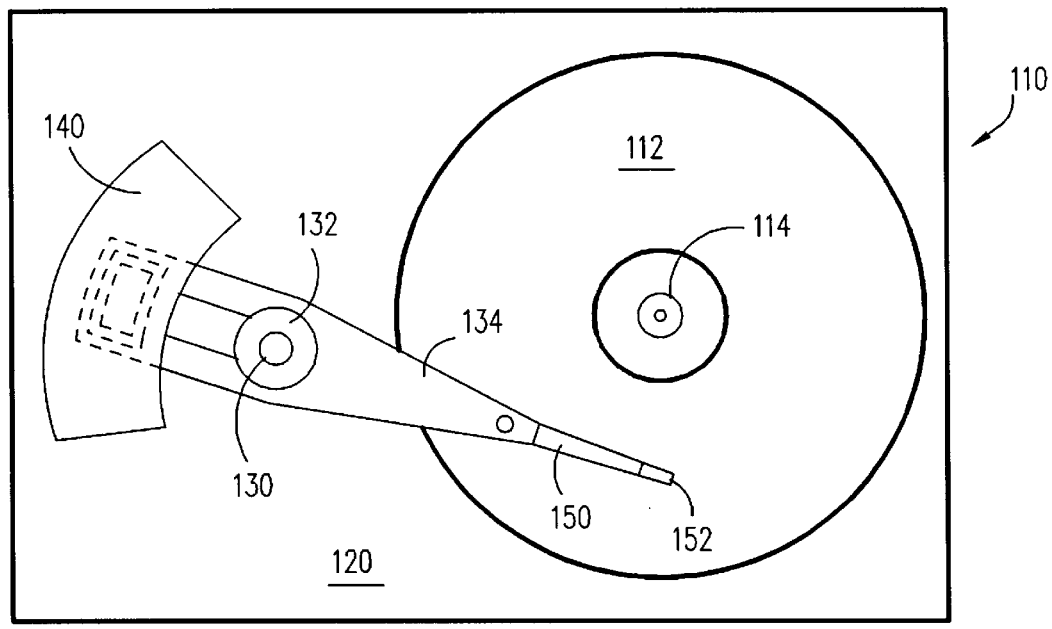
FIG. 2 is a top view of one disk drive system.

FIGS. 1 and 2 show a side and a top view, respectively, of a disk drive system designated by the general reference number 110. The disk drive system 110 comprises a plurality of stacked magnetic recording disks 112 mounted to a spindle 114. The disks 112 may be conventional particulate or thin film recording disks or, in other embodiments, they may be liquid bearing disks. The spindle 114 is attached to a spindle motor 116 which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of suspension assemblies 150 are attached to the actuator arms 134. A plurality of transducer heads, or sliders 152 are attached respectively to the suspension assemblies 150. The sliders 152 are located proximate to the disks 112 so that, during operation, they are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. This configuration allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in *The Magnetic Recording Handbook*, C. Dennis Mee and Eric D. Daniel, McGraw-Hill Book company, 1990.

Figure 3:
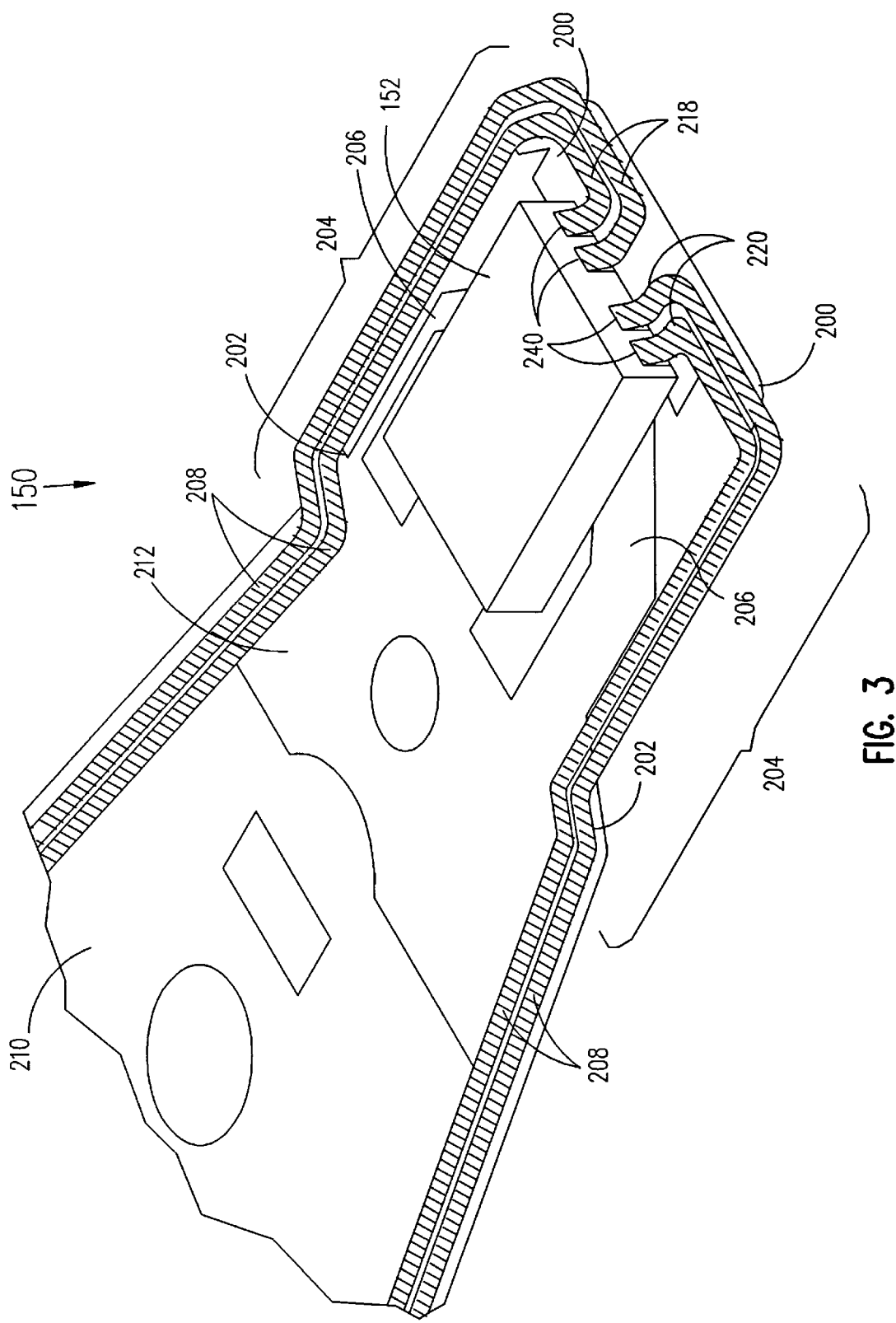
FIG. 3 is a isometric view of the suspension in accordance with the present invention having conductive leads, bending tabs, and transducers or read/write heads mounted on a slider. The slider is attached to the gimbal area of the suspension.
Figure 4:
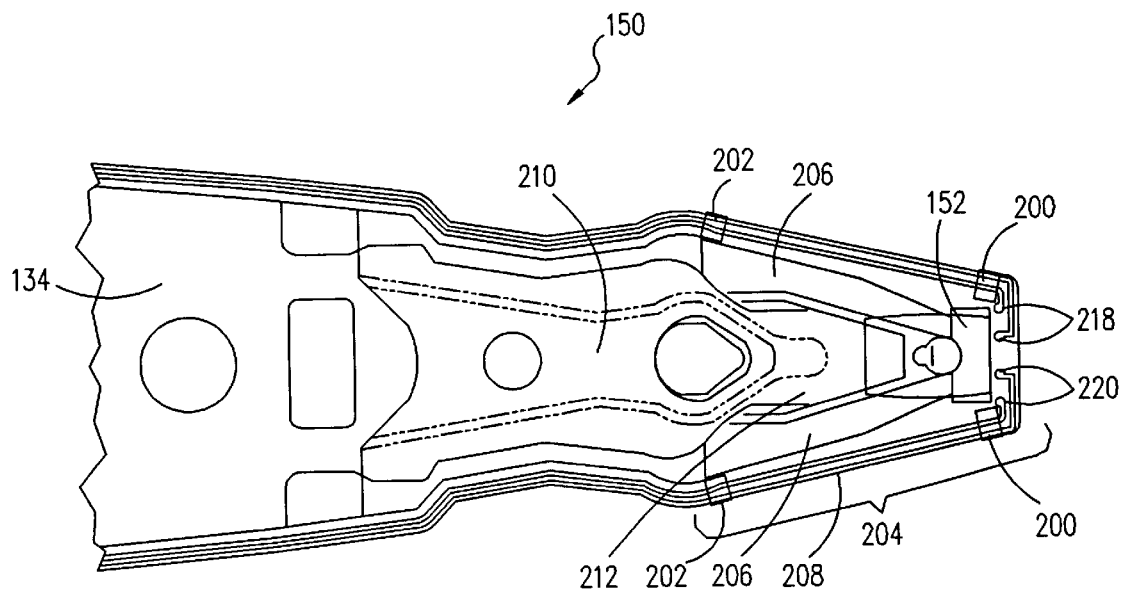
FIG. 4 is a top view of the suspension shown in FIG. 4.
Figure 5:
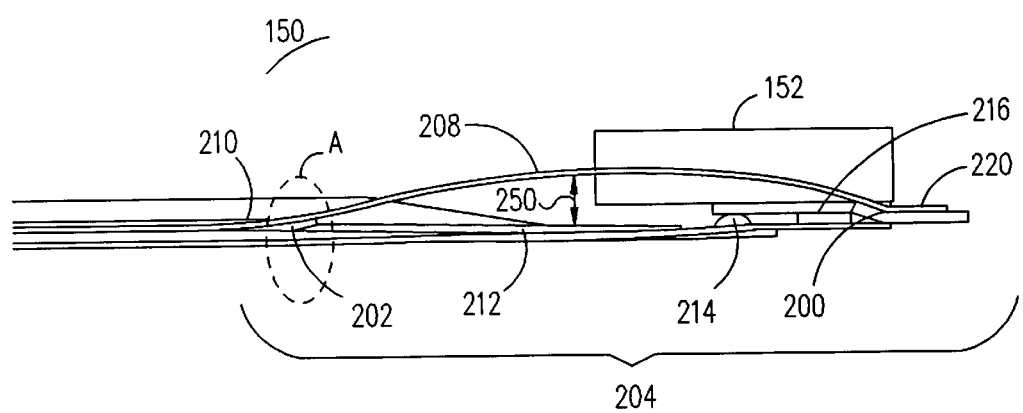
FIG. 5 is a side, cross sectional view of the suspension in accordance with the present invention, showing the orientation of the elongated traces and placement provided by the bend tabs.
Figure 6:
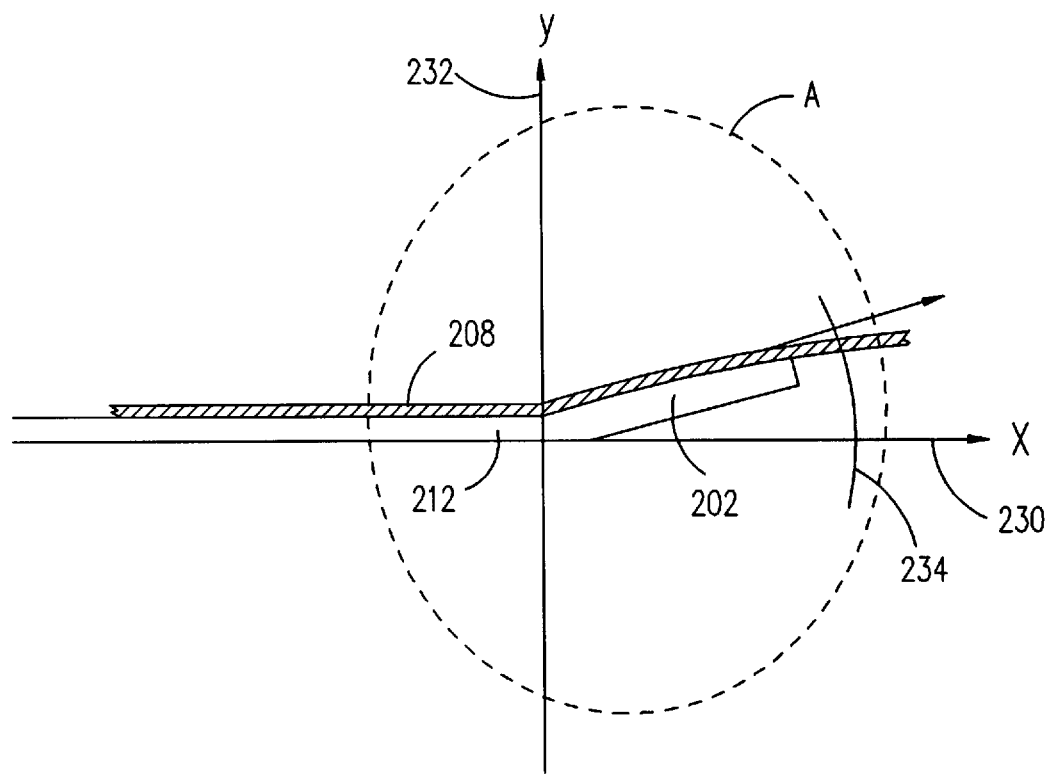
FIG. 6 is an enlarged view of the bend tab in the gimbal area of the suspension as shown in FIG. 5.
Figure 7:
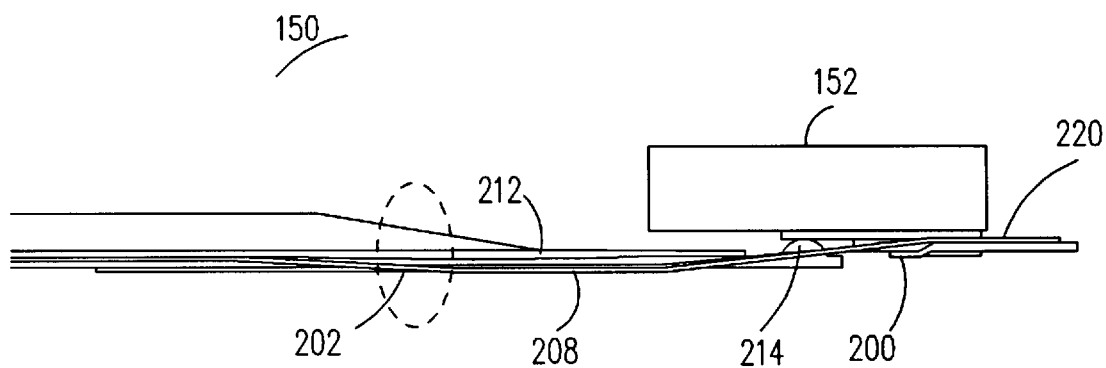
FIG. 7 is a side, cross sectional view of the suspension showing an alternative embodiment of the orientation of the elongated traces and placement provided by the bend tabs.

FIGS. 3–7 show various views of the preferred embodiment of the suspension assembly in accordance with the present invention. Particularly, FIG. 3 is a perspective view of the suspension of the present invention having conductive leads, bend tabs, and a slider attached to the gimbal area of the suspension. FIG. 4 is a top view of the suspension shown in FIG. 3. FIG. 5 is a side, cross sectional view of the suspension in accordance with the present invention, showing the orientation of the elongated traces and placement provided by the bend tabs, and FIG. 6 is an enlarged view one bend tab in the gimbal area of the suspension. FIG. 7 shows side, cross sectional view of an alternative orientation of the traces provided by the bend tabs of the present invention.

With reference to FIG. 3, it is seen that the integrated suspension assembly 150 of the present invention is comprised of a relatively rigid load member 210, and a flexible member 212 mounted on the load member 210. A slider 152 is attached to the gimbal area at one end of the flexure. The flexible member 212 is a multi-layer laminate structure having a base or substrate layer, an insulating layer and an electrically conductive layer formed on the base layer. The first electrically conductive layer is etched to form a plurality of conductive leads 208. The conductive leads 208 interconnect the slider 152 to a read/write electronics module back at the actuator arm 134. The conductive leads 208 being in electrical connection with the MR read sensor 220, and the other pair of leads 208 being in electrical connection with the write transducer 218. The leads may be bonded to the slider pads 240 by conventional ultrasonic bonding processes or soldering.

With reference to FIG. 4, it is seen that the conductive leads 208 extend beyond the edge of the flexible member 212 in the gimbal area of the suspension, indicated by reference numeral 204. A first pair 200 of tabs press against the conductive leads at the slider 152 end of the suspension. A second pair of tabs 202 press against the conductive leads near the load beam end of the suspension. In a preferred embodiment, side tab pairs 200, 202 protrude from the sides of the flexible member, defining the endpoints of the area 204 where the conductive leads 208 extend beyond the edge of the flexible member 212. In a preferred embodiment, the bend tabs protrude outwardly a distance approximately equal to the width of the conductive leads. Typically this distance will be in the range of 0.15 to 0.5 mm. The distance may be increased or decreased depending upon the width of the conductive leads, the number of conductive leads, and the desired operational characteristics of the suspension assembly. In a preferred embodiment, the width of the tabs is 0.25 mm. It is desirable to maintain the size of the tabs to as small as possible without compromising the structural rigidity of the tabs.

FIG. 5 shows a side cross sectional view of a suspension in accordance with the present invention. As seen in FIG. 5, side tabs 200, 202 occupy a plane which is at an angle to the horizontal plane of the suspension. It is also seen that the plane occupied by the first pair of bend tabs 200 is opposite the plane occupied by the second pair of bend tabs 202. The bend tabs 200, 202 press against the conductive traces 208 in the gimbal area of the suspension 150 causing the traces 208 to form an arc or a curve therebetween. In a preferred embodiment, the conductive leads 208 are longer than the side edges of the flexible member 212, so as to form an exaggerated curve therebetween. For example, the conductive leads may be formed between 0.05 and 0.15 mm longer than the side edge of the suspension, depending on the desired operational characteristics of the suspension. It has been found that minimizing the static attitude and stiffness contribution of the conductive leads 208 to the operation of the suspension is accomplished by such an intentional elongation of the length of the leads. By making the leads longer, an exaggerated curve forms between the side tab constraints, indicated generally by reference numberal 204. This large curve resulting from the extra length built into the traces relieves the tensional pull on the flexure when the slider is flying and gimbaling. It has been found that static stiffness, especially pitch stiffness may be reduced by as much as 50%. Results are shown in Table 1 below:

| Distance of Traces from Flexure Center Point (mm) | Pitch Stiffness (N-mm/rad) |
|---|---|
| 0 | 0.076 |
| 0.01 | 0.068 |
| 0.23 | 0.057 |
| 0.035 | 0.048 |

As seen in Table 1, as the length of the conductive lead, measured by distance "d" indicated by reference numeral 250 in FIG. 5, was increased from zero (no intentional elongation) to 0.035, the pitch stiffness of the suspension was also reduced, thereby improving the performance characteristics of the suspension. It is noted that the foregoing results were obtained from measuring an integrated suspension having four traces, two on each side of the suspension, and two pairs of bend tabs. The overall effects on pitch stiffness, however, is also dependent upon various suspension designs and configurations.

It has also been found that increasing the length of the conductive leads 208 helps to compensate or absorb changes in the length of the conductive leads due to manufacturing tolerance build up or temperature and humidity changes.

Referring now to FIG. 6, which is an exploded view of one of the bend tabs 202, it is seen that the bend tabs 202 occupy a plane at an angle to the horizontal axis of the suspension. In FIG. 6, flexible member 212 generally occupies the horizontal axis 230 of the suspension 150. Second bend tab 202 is positioned in a plane set at an angle between 3° and 15°. In other embodiments, this angle may be greater or smaller, depending on the desired characteristics of the suspension, and the disk spacing in the disk drive. It is understood that during operation, while the slider is flying and gimballing, the flexible member 212 moves about within this frame of reference. Since the bend tabs 200, 202 are integrally formed with the flexible member 212, they too will move within the frame of reference, but will remain at the same angle in relation to the flexible member 212. Although FIGS. 3–6 show side tabs 200, 202 orienting the conductive leads 208 upward into the same plane as the slider 152, the tabs 200, 202 could be angled such that the conductive leads 208 are oriented to curve below the slider and flexure, as shown in FIG. 7. Further, although the Figures show two pairs of tabs 200, 202, in an alternative embodiment, there may be only the first pair of bend tabs 200 disposed proximate the slider termination pads 240, or the second pair of bend tabs 202 near the load beam 210 end of the flexible member 212. In either alternative embodiment, the conductive leads 208 would still be constrained into one direction, thereby controlling the orientation of the conductive leads 208.

Referring back to FIG. 5, the various layers of the flexible member 212 are indicated in a top down sequence in side views. The structure layer of the flexure is a sheet of flexible material which may be stainless steel, or other suitable spring like material (about a thickness of about 18 to 35 microns in a preferred embodiment) that can provide the desired elastic deflections. It may be shaped by etching or stamping processes. The bend tabs are formed as part of the structure layer. An insulating layer is an intermediate layer separating the structure layer and the conductive leads 208. The electrically insulating layer is preferably a dielectric material such as alumina, silicon nitride, or polyimide to provide electrical insulation between the conductive traces 208 and the base material. A layer of conductive material overlies the insulating layer. The conductive layer is preferably made of copper or of gold plated copper, which is etched to form a plurality of conductive traces 208. The insulating and conductive layers may be formed by using conventional photo lithographic processes well known in the art. The suspension also includes a mount plate 216 to which the slider 152 is attached. The mount plate 216 is of the same material as the support layer, and is formed in the same process as the support layer. It is noted that sections of the leads 204 which are positioned beyond the edge of the support layer are maintained in a fixed spaced apart relationship by the dielectric material at the side tabs 200, 202. This configuration is intended to eliminate contact between the base layer and the conductive leads.

The flexure 212 is structured and attached to the load beam 210 in a manner as to provide the desired gimbal motions. The load beam 212 is generally flat and rigid, made of stainless steel or ceramic material, for example. In one embodiment, the load beam is stainless steel of about 0.038 to 0.064 mm thick. For faster slider positioning response in the disk drive system 110 it is desirable to maintain the weight and inertia of the load beam 210 to as small as possible without compromising the structural integrity.

While the preferred embodiment of the present invention have been illustrated herein in detail, it should be apparent that modifications and adaptations to those embodiments may occur to those skilled in the art without departing from the scope of the present invention as set forth in the following claims.

I claim:

1. An integrated suspension assembly for supporting a slider in a magnetic storage system comprising:

a load member;

a flexure including a flexible member and conductive leads integrally formed therewith, said slider being mounted on the flexible member at one end thereof in electrical connection to the leads said conductive leads extending along the side and unsupported by the flexible member in the slider region of the flexure; and a first pair of tabs protruding substantially perpendicular from the lateral edges of the flexible member, the tabs being integrally formed to press against the conductive leads and occupying a plane which is angled in relation to the horizontal plane of the flexible member; the first pair of tabs being formed such that the conductive leads are bent and unsupported in the slider region of the flexure in conformance with the angled pair of tabs whereby the bent conductive leads are vertically offset from the horizontal plane of the flexible member;

wherein said conductive leads are oriented in the plane of the first pair of tabs.

2. The integrated suspension assembly of claim 1, wherein said first pair of tabs protrude from opposite lateral edges of the flexible member at the slider region of the flexible member.

3. The integrated suspension assembly of claim of claim 2, further comprising a second pair of tabs protruding substantially perpendicular from the lateral edges of the flexible member, the second pair of tabs being integrally formed to press against the conductive leads and occupying a plane opposite the first pair of tabs.

4. The integrated suspension assembly of claim 1, wherein the pair of tabs protrude from the same lateral edge of the flexible member.

5. The integrated suspension assembly of claim 3 wherein the conductive leads are longer than the lateral edges of the flexible member such that the conductive leads form a curve between the first pair of tabs and the second pair of tabs.

6. The integrated suspension assembly of claim 5, wherein the leads are integrally formed on the flexible member by a photo lithographic process.

7. A data recording disk drive comprising:

a disk with a data surface of concentric data tracks;

means attached to the disk for rotating the disk about an axis generally perpendicular to the disk;

a slider maintained in operative relationship with the data surface when the disk is rotating;

a transducer attached to the slider for reading data from and writing data to the data surface;

an actuator for moving the slider generally radially to the disk to allow the transducer to access the data tracks;

an electronics module for processing data read from and written to the data surface;

a suspension comprising a load member, and a flexible member, said slider being mounted to the flexible member at one end thereof in electrical connection to a plurality of electrically conductive leads interconnecting said transducer and said electronics module, each of said leads having a bonding area near each of its ends for connection to the transducer and the electronics module, said conductive leads extending along the side of and unsupported by the flexible member in the slider region of the flexible member;

a first pair of tabs protruding substantially perpendicular from the lateral edges of the flexible member, the tabs being integrally formed to press against the conductive leads and occupying a plane which is angled in relation to the horizontal plane of the flexible member such that the conductive leads are oriented in the plane of the first pair of tabs;

a generally rigid support arm having two ends, its first end attached to the suspension and its second end attached to the actuator; wherein the first pair of tabs are formed such that the conductive leads are bent and unsupported in the slider region of the flexible member in conformance with the angled pair of tabs whereby the bent conductive leads are vertically offset from the horizontal plane of the flexible member.

8. The data recording disk drive of claim 7, further comprising a second pair of tabs protruding substantially perpendicular from the lateral edges of the flexible member, the second pair of tabs being integrally formed to press against the conductive leads and occupying a plane opposite the plane of the first pair of tabs.

9. The data recording disk drive of claim 8, wherein the conductive leads are longer than the lateral edges of the flexible member such that the conductive leads form a curve between the first pair of tabs and the second pair of tabs.

10. The data recording disk drive of claim 7, wherein the pair of tabs protrude from the same lateral edge of the flexible member.

* * * * *